Figure 1:
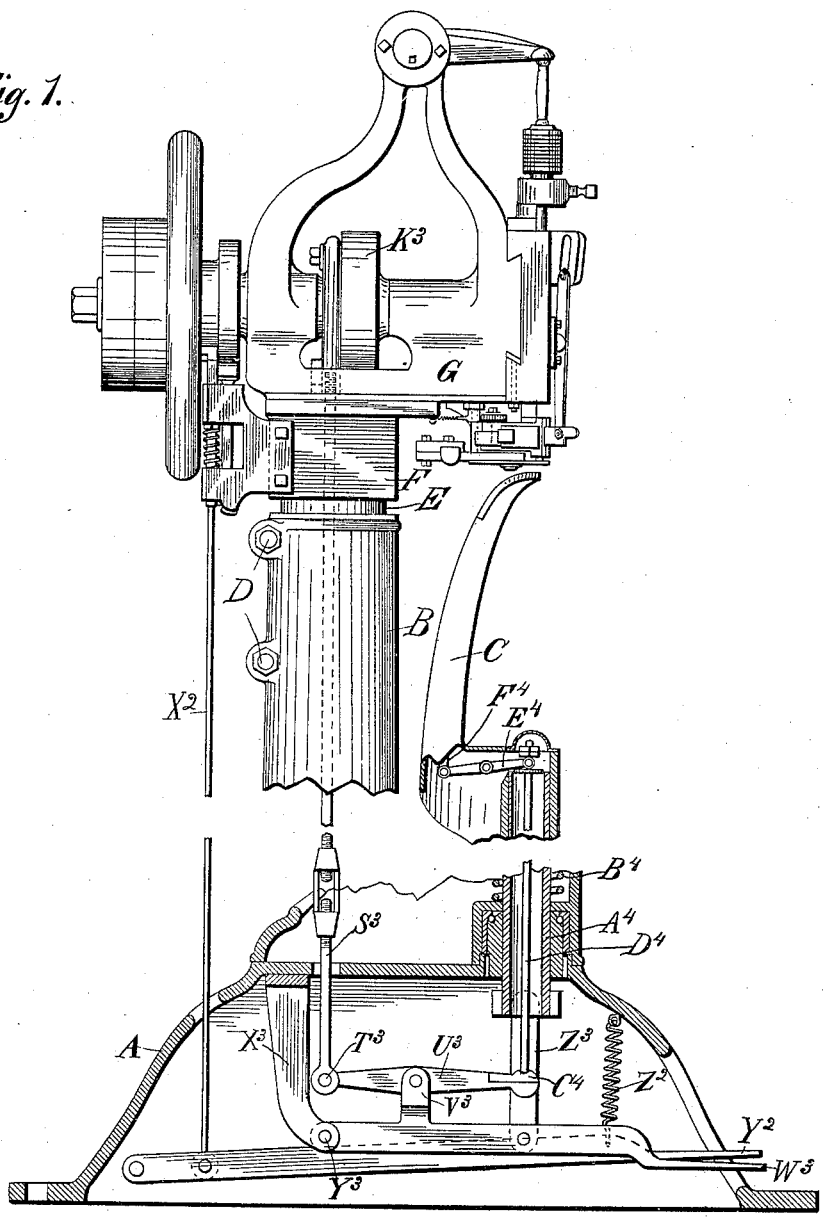

No. 652,031. Patented June 19, 1900.
A. G. LEONARD, A. GRAFFAM & B. R. WOLCOTT.
PEGGING MACHINE.
(Application filed Sept. 11, 1899.)

(No Model.) 4 Sheets—Sheet 1.

Witnesses:
W. C. Coulies
W. H. Cotton.

Inventors:
Arthur G. Leonard.
Alonzo Graffam.
Byron R. Wolcott
By Coburn, Stibben & McElroy
Attys.

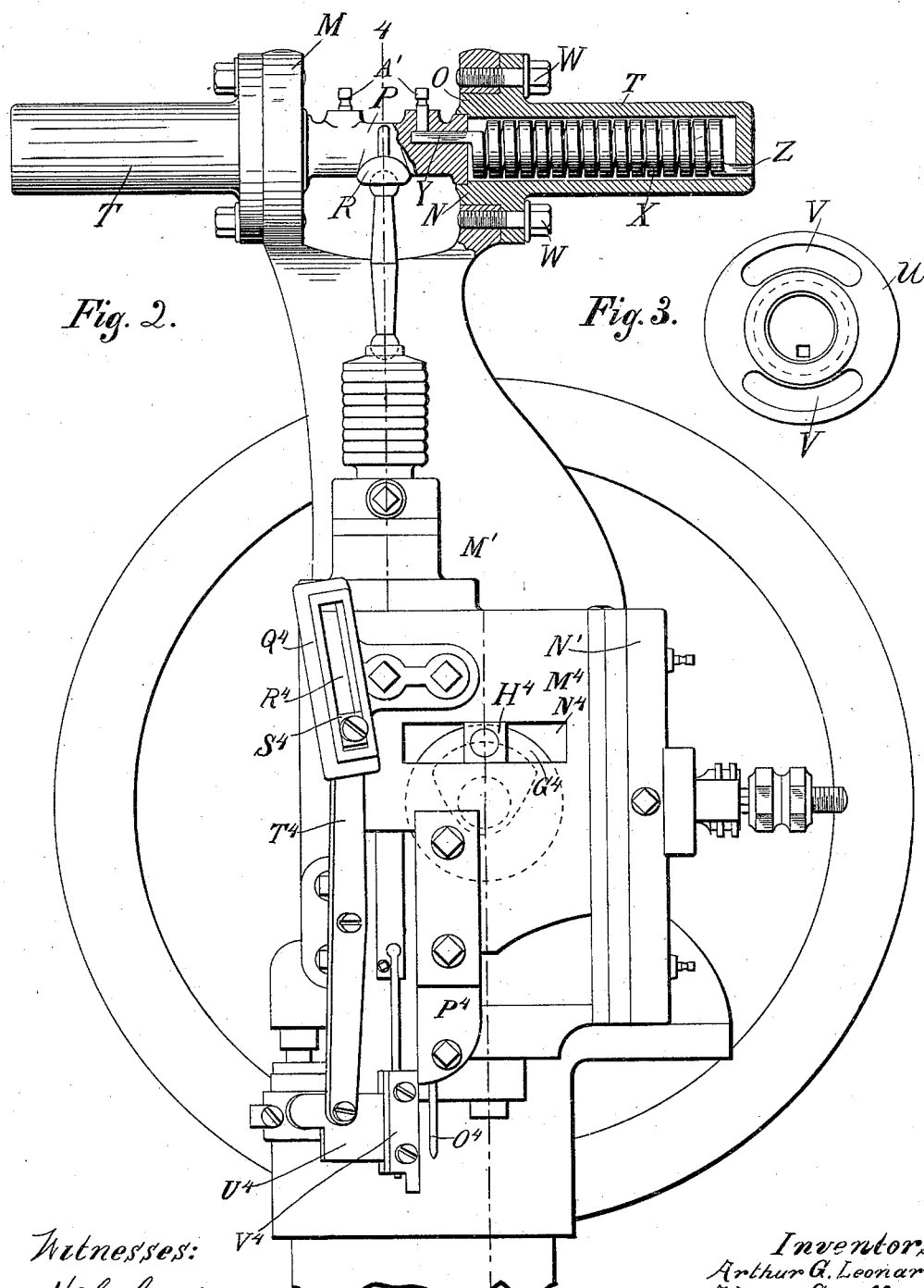

No. 652,031. Patented June 19, 1900.
A. G. LEONARD, A. GRAFFAM & B. R. WOLCOTT.
PEGGING MACHINE.
(Application filed Sept. 11, 1899.)
(No Model.) 4 Sheets—Sheet 3.
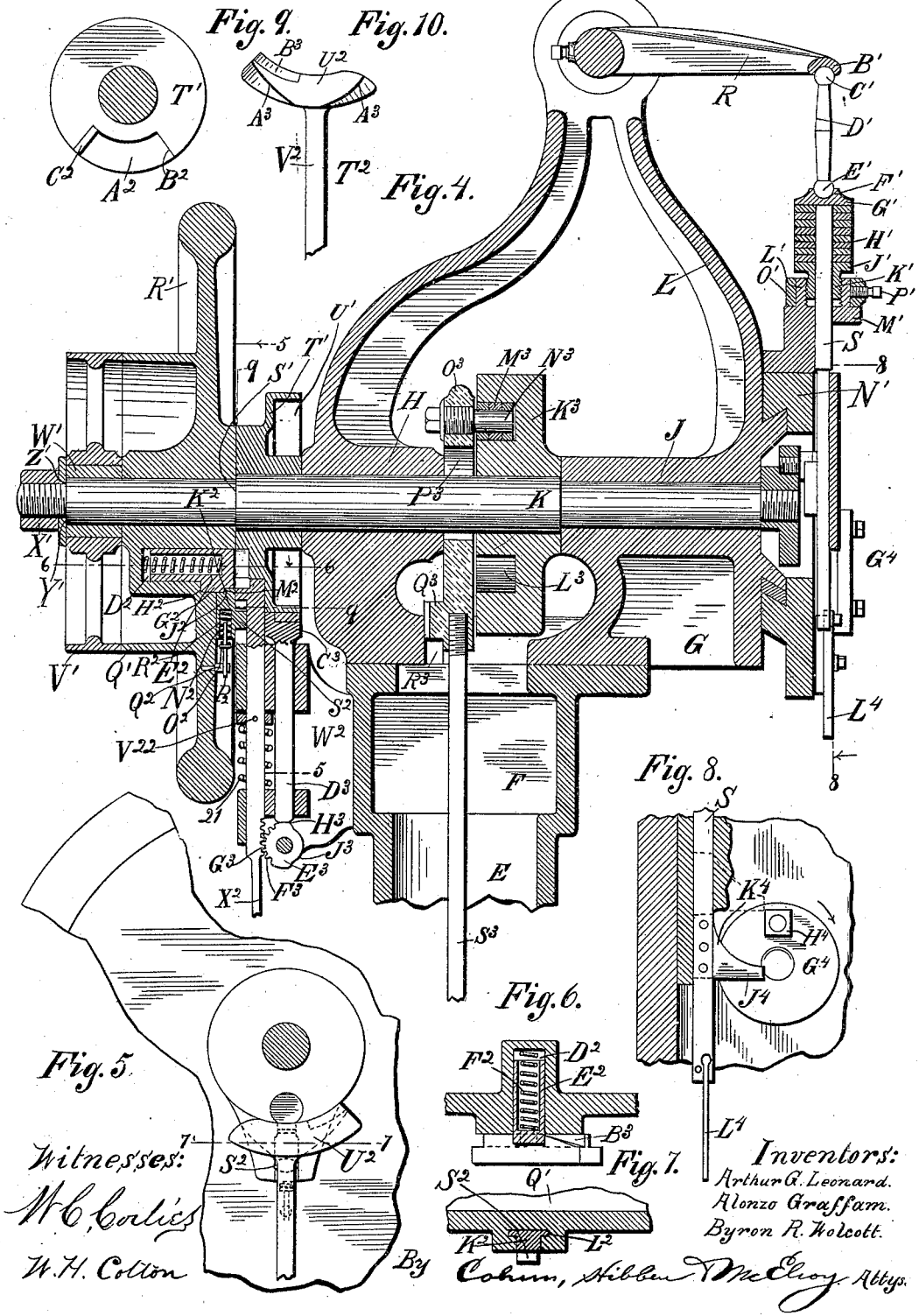

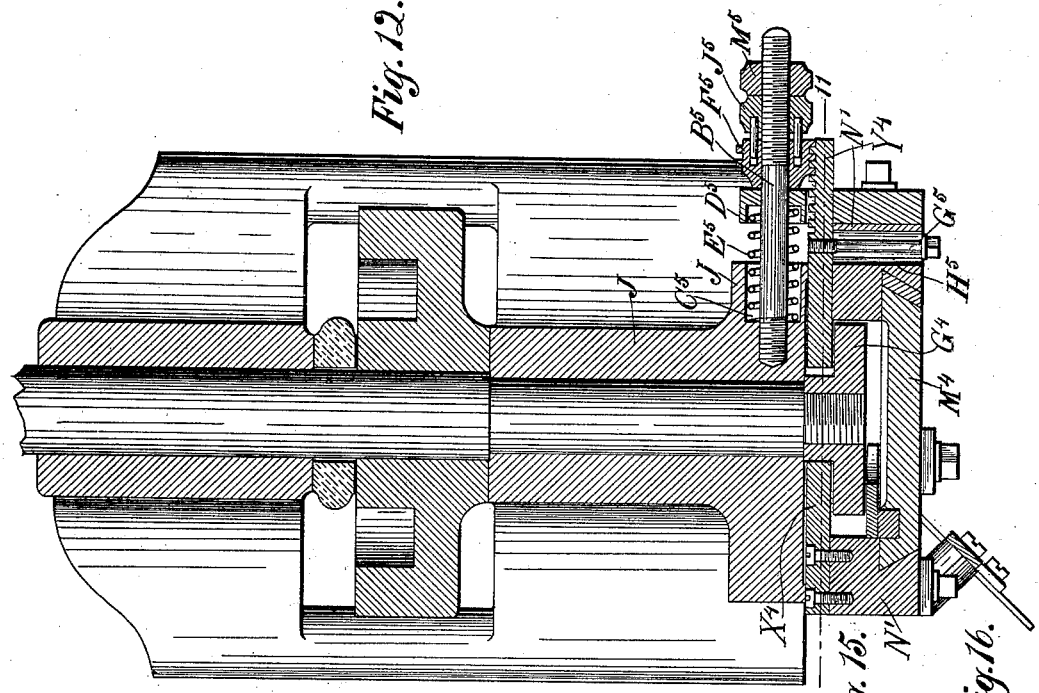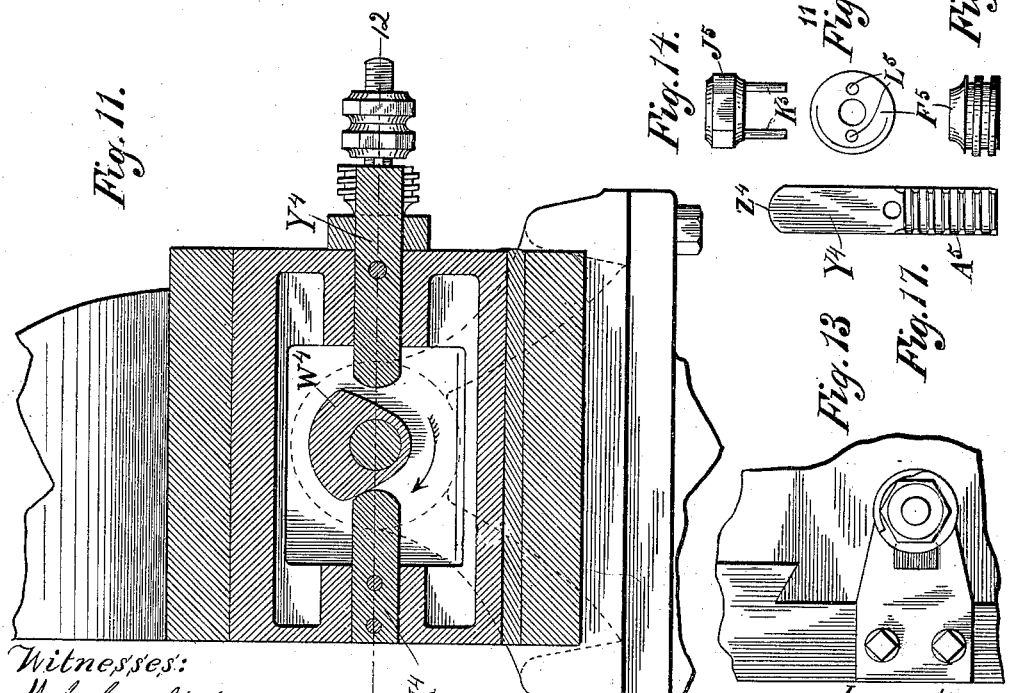

UNITED STATES PATENT OFFICE.

ARTHUR G. LEONARD, ALONZO GRAFFAM, AND BYRON R. WOLCOTT, OF DE KALB, ILLINOIS.

PEGGING-MACHINE.

SPECIFICATION forming part of Letters Patent No. 652,031, dated June 19, 1900.

Application filed September 11, 1899. Serial No. 730,080. (No model.)

*To all whom it may concern:*

Be it known that we, ARTHUR G. LEONARD, ALONZO GRAFFAM, and BYRON R. WOLCOTT, citizens of the United States, residing at De Kalb, in the county of De Kalb and State of Illinois, have invented certain new and useful Improvements in Pegging-Machines, of which the following is a specification.

Our invention relates to certain new and useful improvements in pegging-machines of the general type shown in our Patent No. 629,512, dated July 25, 1899, in which the pegs are driven into the boots or shoes and the projecting ends thereof are cut off by the same operation of the machine.

Our invention is concerned with certain new and useful improvements in the mechanism for reciprocating the front plate horizontally, also with new and useful connections between the driving-shaft and the knife in the horn for reciprocating said knife at each rotation of the shaft, and is finally concerned with certain details of construction, all of which will be fully set out in the description and embodied in the claims.

Referring to the drawings, in which the same letters of reference are used to designate identical parts in all the views, Figure 1 is a side elevation of the complete machine with parts broken away and in section to illustrate certain of our improvements. Fig. 2 is a front elevation of the head of the machine on a somewhat-larger scale. Fig. 3 is an end elevation of the spring-cap, showing the construction whereby the tension of the driving-spring may be adjusted as may be desired. Fig. 4 is a side elevation of the head in section on the line 4 4 of Fig. 2. Fig. 5 is a rear elevation of the belt-pulley and some of its clutch connections as on the line 5 5 of Fig. 4. Fig. 6 is a detail in section on the line 6 6 of Fig. 4. Fig. 7 is a detail in section on the line 7 7 of Fig. 5. Fig. 8 is a detail in section on the line 8 8 of Fig. 4. Fig. 9 is a front elevation of the face of the clutch member which is rigid on the driving-shaft, as if in elevation on the line 9 9 of Fig. 4. Fig. 10 is a rear elevation of the switch member, the front elevation of which is shown in Fig. 5. Fig. 11 is a sectional view of the mechanism for reciprocating the front plate horizontally on the line 11 11 of Fig. 12. Fig. 12 is a central view through the head of the machine as on the line 12 12 of Fig. 11. Fig. 13 is a fragmentary side elevation of the head. Fig. 14 is a side elevation of the adjusting-nut for regulating the length of the feed. Figs. 15 and 16 are a plan view and side elevation of an adjusting-worm; and Fig. 17 is a plan view of an adjustable abutment, the position of which determines the length of the feed.

The base A may be of any desired shape and construction and has supported thereon the column B for supporting the head and the horn-post C, which is of the same general construction as that shown in our Patent No. 629,512, above referred to. The column B has adjustably secured therein by the bolts D the pillar E, which terminates in the head F, upon which is adjustably secured in any desired manner the stationary frame G of the pegging-head proper. This frame G has formed therein the bearings H and J for the horizontal shaft K, which drives the various moving parts of the machine. The frame G has its upper part formed in the shape of an inverted yoke L, the extreme upper end of which is again divided to form two stationary annuli M. These annuli receive the inner ends N of the spring-caps T, which have their inner surfaces offset, as at O, to form the bearing for the rock-shaft P, which carries the arm R for driving the driver-bar S. By this construction I am enabled to simplify materially the mechanism and dispense with the separate bushings for each end of the rock-shaft which have hitherto been employed in such machines. The spring-caps T consist of the body portion, having the circular flange *u*, containing the circular slots V, through which the set-screws W pass to take into the annuli M to secure the helically-coiled spring X in any desired degree of tension. The squared ends of this spring S are secured in the apertures Y and Z, formed in the ends of the rock-shaft P and the spring-caps T, respectively. The set-screws A' may be employed to secure the ends of the spring within the apertures Y, if desired. The outer end of the lever R is formed with the socket B' for the ball-shaped end C of the connecting-piece D', the other ball-shaped end of which, E', fits into the shallow socket or bearing F' of the head G' of the driver-bar S. This driver-bar S has surrounding its upper end beneath the head G' the series of leather washers H', which rest upon the bearing-ring J', which has its lower tubular end K' screwed into the interiorly-screw-threaded split ring L', which is formed upon the upper end of the bracket M', which in turn is secured to the upper side of the front plate N'. We preferably split the ring L' and surround it with a clamping-ring O', having the set-screw P', by which the bearing-ring J' may be clamped in any desired position of adjustment to absolutely prohibit its turning. The driver-bar S is raised and lowered in the manner and by the means to be subsequently described at each revolution of the shaft K, and it is also carried horizontally to the right and left during the same interval by reason of its being mounted in the front plate N', which reciprocates to the right and left, as is customary in the operation of this type of machine. The connecting-piece D' being provided with the ball-and-socket joint at either end permits the slight horizontal movement of the driver-bar S that is necessary without disconnecting the parts, which are held together by the downward pressure exerted by the springs X upon the arm R. The washers H' serve to cushion the blow, and the bearing-ring J' furnishes the means for adjusting the hammer to any height that may be desired.

The shaft K has loosely mounted on its rear end the belt-wheel Q', which is preferably formed with the fly-wheel R' rigidly connected therewith. This belt-wheel preferably rests against the shoulder S', formed upon the shaft K, and rigidly secured to this shaft is the disk T', which forms the member of the clutch which is fixed to the shaft, and we preferably form in connection therewith the brake wheel or disk U'. The belt-wheel Q' has a loose pulley-wheel V', mounted on the sleeve W', forming the outer end of said pulley-wheel, the pulley-wheel and belt-wheel being retained in place by the nut X', coöperating with the washer Y' against the shoulder Z', formed near the end of the shaft K.

For the purpose of connecting and disconnecting the belt-wheel Q' to and from the clutch disk or member T' we employ the following mechanism: The clutch-disk T' has formed in its outer face the cut-away portion $A^2$, which has one end terminating in a square shoulder $B^2$, while the other end terminates in a similar shoulder formed by the inserted piece $C^2$, of hardened steel. The belt-wheel Q' has an aperture $D^2$ formed therein at the same radial distance from the center of the shaft K as is the notch or cut-away portion upon the clutch member T'. This aperture $D^2$ contains a spring-pressed plunger $E^2$, which we preferably make in the form of a hollow cylinder open at its inner end and inclose the helical expanding-spring $F^2$ between the ends of the aperture $D^2$ and the hollow cylinder. To hold the spring-pressed plunger or locking-bolt $E^2$ in retracted position, it has a rectangular projection $G^2$ formed on its under side, which projection takes in a similarly-shaped channel $H^2$, formed in the under side of the cylindrical aperture $D^2$, to guide the plunger $E^2$ and to prevent its turning. The lug $G^2$ has formed thereon the square shoulder $J^2$, with which coöperates a radially-sliding plunger $K^2$, which is of the cross-section shown in Fig. 7 and which slides radially in the channel $L^2$, formed in the inner face of the belt-wheel Q'. The upper end of this plunger $K^2$ is formed with a shoulder $M^2$, which coöperates with the shoulder $J^2$ on the plunger $E^2$ to hold the plunger $E^2$ in its inward position against the resistance of the spring $F^2$. The helically-coiled expanding-spring $N^2$ is interposed between the plunger $K^2$ and the abutment $O^2$, preferably by placing it so as to surround the pin $P^2$, which has an abutment $Q^2$ thereon, and is inclosed by a cylindrical opening $R^2$ in the plunger. The plunger $K^2$ has the lug $S^2$, of the shape shown in Figs. 4, 5, and 7, projecting therefrom into the plane of the clutch member T'. When the parts are in the position shown in Fig. 4, it will be readily apparent that if the plunger $K^2$ be pulled down by the pressure exerted on the lug $S^2$ the shoulder $M^2$ will be disengaged from the shoulder $J^2$, and the plunger $E^2$ will shoot outward under the force of the spring $F^2$, and as soon as it enters the aperture $A^2$ and abuts against the square shoulder $B^2$ the shaft K will be carried with the belt-wheel until it is uncoupled in some manner. To effect this coupling and also the subsequent uncoupling, we provide a switch member $T^2$, which consists of the head $U^2$ and the elongated body portion $V^2$, which slides vertically in bearings formed in the bracket $W^2$, secured to the head F of the column B. This body portion $V^2$ is extended to form the rod $X^2$, which is pivotally connected at its lower end to a treadle or foot-lever $Y^2$, which is normally held in its upper position by the coiled spring $Z^2$, connected thereto and to the base A, as shown in Fig. 1. The spring $V^{21}$, surrounding the body portion $V^2$ and confined between the pin $V^{22}$ and the bracket $W^2$, may also be employed to assist it. The face of the head $U^2$, which is adjacent to and coöperates with the plunger $K^2$, is shaped as shown in Fig. 10, and has a cam-surface $A^3$ on the under side thereof, which coöperates with the lug $S^2$ when the switch member $T^2$ is drawn down by the pressure of the treadle $Y^2$ to cam down the plunger $K^2$ and to permit the plunger $E^2$ to clutch the belt-wheel Q' to the clutch member T'. As soon as these parts are clutched the bottom part of the lug $G^2$ rests upon the top of the plunger $K^2$ and holds it in its outward position against the tendency of its spring $N^2$ to force it inward. As long as the switch-piece $U^2$ remains in its lower position the parts are clutched and the machine continues to run. When it is desired to stop the machine, the foot is taken off of the treadle $Y^2$ and the switch member $T^2$ rises under the stress of the spring $Z^2$ and the head $U^2$ comes into the plane of the plunger $E^2$. This head $U^2$ has formed thereon a cam-surface $B^3$, (shown best in Figs. 6 and 10,) which coöperates with the outer end of the lug $G^2$ on the plunger $E^2$ to cam it back to its innermost position, and as soon as this position is reached the plunger $K^2$, moving upward under the stress of its spring $N^2$, causes its shoulder $M^2$ to catch the shoulder $J^2$ and lock the plunger $E^2$ in its inoperative position, at which time the revolution of the shaft $K$ is stopped. To assist in the stopping of this shaft $K$, we place the curved shoe-brake $C^3$ of the ordinary construction upon the upper end of the bar $D^3$, which is mounted in bearings in the brackets $W^2$, adjacent to the bearings of the body portion of the switch member $T^2$. To raise the brake to stop the shaft $K$ as soon as the parts are unclutched and similarly to lower the brake when the parts are clutched, we employ the mechanism shown in detail in Fig. 4, where it will be seen that we employ a small cam-wheel $E^3$, suitably journaled in the bracket $W^2$ and having on one side thereof the gear-teeth $F^3$, which mesh with the corresponding gear-teeth $G^3$ upon the adjacent side of the body portion $V^2$ of the switch member $T^2$. The cam-wheel $E^3$ is provided with the two surfaces $H^3$ and $J^3$, which are at different distances from the center, and it will be readily seen that when the switch member $T^2$ moves to its uppermost position to unclutch the parts the brake-bar $D^3$ will be moved up so that the brake-shoe $C^3$ presses against the brake-wheel $U'$. As soon as the switch member $T^2$ is pulled down the surface $J^3$, coming beneath the bar $D^3$, permits the bar to fall, and thus remove the pressure of the brake-shoe.

Referring now especially to Figs. 1 and 4, the shaft $K$ has rigidly secured thereon the cam-wheel $K^3$, which has the cam-groove $L^3$ in one surface thereof, which groove has therein the antifriction-roller $M^3$, mounted upon the stud $N^3$, secured upon the upper end of the vertically-reciprocating piece $O^3$. This piece $O^3$ has the slightly-elongated aperture $P^3$, through which the shaft $K$ passes, and its lower side has formed thereon the lug $Q^3$, coöperating with the vertical channel $R^3$ in the frame $G$. It will be readily seen that with these positions of the parts the piece $O^3$ will be raised and lowered once in each operation, the groove $L^3$ being so shaped as to give the member $O^3$ one quick upward movement at each revolution of the shaft $K$. This piece $O^3$ has screwed or otherwise secured into its lower end the connecting-rod $S^3$, which has its lower end pivotally secured, as at $T^3$, to one end of the horizontal lever $U^3$, which is pivotally mounted in the yoke or bearing $V^3$, rigidly secured to or formed integral with the treadle $W^3$, which is pivoted at its end to a bracket $X^3$ at the point $Y^3$ directly beneath the pivotal point $T^3$. This treadle $W^3$ has pivotally secured thereto the links $Z^3$, by which it is secured to the vertically-sliding and rotatable horn-post $A^4$, which is of the same construction as that shown in our Patent No. 629,512, previously referred to. This horn-post $A^4$ is moved down against the stress of the surrounding coiled spring $B^4$ by pressure upon the treadle $W^3$ when it is desired to lower the horn $C$ to remove the work, and the expanding tendency of the helically-coiled spring $B^4$ serves to raise the horn-post, together with the lever $W^3$ and its connections, to their normal position when the pressure is taken off of said lever or treadle $W^3$. The lever $U^3$ has pivotally connected to its outer end, preferably by ball-and-socket joint, as shown at $C^4$, the connecting-rod $D^4$, which extends up through the horn-post $A^4$ and is connected by the horizontal lever $E^4$ with the thrust-rod $F^4$, which serves to operate the knife in the same manner as shown in our aforesaid prior patent, No. 629,512. By substituting this lever $U^3$, with its pivotal point $T^3$ directly over the pivotal point of the treadle $W^3$, we are enabled to dispense with the bell-crank-lever construction shown in our aforesaid patent, No. 629,512, and still obtain a construction in which the operation of the knife will not be affected by the vertical or rotary movement of the horn, and vice versa. It will be readily seen that owing to the lever $U^3$ being pivotally mounted upon the treadle $W^3$ and also having its pivotal point $T^3$ directly over the pivotal point $Y^3$ the movement of the horn will not cause any relative movement of the connecting-rod $D^4$ and its associated parts.

The outer end of the shaft $K$ is provided with the disk $G^4$, which has pivotally secured thereon the square block $H^4$, which has a double function. The first function of this block which may be mentioned is that of coöperating with the square under surface $J^4$ of the abutment $K^4$, which is secured to the driver-bar $S$, as shown in Fig. 8. As the shaft $K$ rotates in the direction of the arrow, as shown in Fig. 8, the square block $H^4$ takes against the under side of the abutment $K^4$ and raises the driver-bar $S$ to the position shown in dotted lines in Fig. 8 and retains it there until the continued rotation of the disk $G^4$ carries the block $H^4$ from beneath the abutment $K^4$ and allows the driver-bar $S$ to descend very quickly under the impulse of the springs $X$ to drive the peg. Immediately after the peg is driven by the driver $L^4$, secured to the bottom of the driver-bar $S$, the connections previously described are operated to advance the knife and cut off the projecting tip of the peg. Immediately thereafter the awl descends by reason of the square block $H^4$ descending and carrying with it the vertically-reciprocating member $M^4$ of the front plate $N'$. This member $M^4$ is mounted in the dovetail channel formed in the face of the plate N' and has therein the horizontal opening or channel N⁴, in which the block H⁴ slides back and forth as it revolves, while at the same time raising and lowering the member M⁴, which has the awl O⁴ secured thereto by being suitably clamped in the jaws P⁴, bolted or otherwise secured to the face of the plate M⁴. As the plate M⁴ is raised and lowered the bracket Q⁴, secured on the face thereof and having the inclined slot R⁴ therein, coöperates with the square block S⁴, pivotally mounted on the upper end of the lever T⁴, which is pivotally mounted upon the face-plate N', the reciprocation of the lower end of which serves to slide the knife U⁴ back and forth in the peg-box cap V⁴ in the manner fully described in our prior application, Serial No. 610,323, filed October 28, 1896.

To secure the horizontal reciprocation of the face-plate N' from right to left, and vice versa, as is necessary for securing the customary awl-feed, we employ the following novel mechanism, (best illustrated in Figs. 11 to 16:) Just back of the disk G⁴ and preferably integral therewith is formed the cam W⁴, which coöperates with the fixed abutment X⁴, screwed onto the rear side of the front plate N'. The other abutment Y⁴, as best shown in detail in Fig. 17, consists of the rectangular bar having the preferably-rounded end Z⁴, and the other end with the screw-threads A⁵ formed across the face thereof. Screwed or otherwise suitably secured in the bearing J is a pin B⁵, the outer end of which is screw-threaded. This pin B⁵ is preferably set in the cavity C⁵, formed in the bearing J, and has slidingly mounted thereon the opposed spring-cap D⁵ and the helical expanding spring E⁵, surrounding the bolt B⁵ and being confined in the aperture C⁵ and by the cap D⁵. On the outside of the cap D⁵ is a small worm-wheel F⁵, the teeth of which mesh with the teeth A⁵ of the abutment Y⁴, so that by turning the worm-wheel F⁵ the position of the abutment Y⁴ can be adjusted as may be desired. When it is adjusted, the screw-bolt G⁵, which passes through the slightly-elongated aperture H⁵ in the face-plate N', is tightened, so as to hold the abutment Y⁴ in its adjusted position. To turn this worm-wheel F⁵, we employ the nut J⁵, which is screwed on the outer end of the pin B⁵ and which is provided with the two pins K⁵, rigidly secured thereto, which take into the opposed apertures L⁵, formed in the worm-wheel F⁵, so that as the nut J⁵ is rotated the worm-wheel is rotated therewith, but is capable of independent longitudinal movement on the pin B⁵, as is necessary in the operation of the device. A jam-nut M⁵ serves to hold the nut J⁵ in the position to which the parts are adjusted.

The operation of the last-described parts will be readily apparent, as it will be seen that as the cam W⁴ rotates in the direction of the arrow in Fig. 11 from the position there shown it will move the front plate N' to the right as far as the position of the abutment Y⁴ will permit. As a matter of fact, however, the expansive force of the spring E⁵, coacting upon the spring-cap D⁵, worm-wheel F⁵, and abutment Y⁴, will cause the front plate N' to move to the right as rapidly as the shape of the cam W⁴, against which the abutment X⁴ presses, will permit. This movement to the right will occur until the worm-wheel F⁵ takes against the nut J⁵, when the further movement of the plate to the right is arrested, and it remains stationary until the enlarged portion of the cam W⁴ comes in contact with the other abutment X⁴, when the plate N' will be cammed to the left against the resistance of the spring E⁵. It will readily be seen that by the adjustment of the abutment Y⁴ the amount of the feed can be controlled, as if the distance between the two abutments is made exactly equal to the width of the cam it will have a horizontal movement equal to the greatest throw of the cam. If the abutment Y⁴ now be moved farther from the abutment X⁴, it will readily be seen that there is a certain amount of lost motion, and the greater the amount of this lost motion the shorter the feed.

The relative positions of the block H⁴, which controls the vertical movement of the awl and head, and the cam W⁴, which controls their horizontal movement, are such that the awl is, supposing that it is in its uppermost position, first caused to descend, piercing the work and in the meantime having no horizontal movement. When its downward movement is completed, it is then moved horizontally in its feeding direction, during which movement it has little or no vertical movement. When this horizontal feeding movement is completed, it is then raised to its uppermost position, from which it is moved horizontally to the original position ready to begin the downward movement of another cycle of operations.

While we have shown our invention as embodied in the form which we at present consider best adapted to carry out its purposes, it will be understood that it is capable of some modifications and that we do not desire to be limited in the interpretation of the following claims except as may be necessitated by the state of the art.

What we claim as new, and desire to secure by Letters Patent of the United States, is—

1. In a pegging-machine, the combination with the rotary shaft having the cam thereon and mounted in suitable bearings, of the front plate arranged to reciprocate horizontally in ways in connection with said bearings, and carrying a stationary abutment to coöperate with said cam, an oppositely-disposed and adjustable abutment also adapted to coöperate therewith, and adjustable spring connections between the bearings for the shaft and said front plate to compel and limit the movement of the plate in one direction, whereby the front plate is moved positively in one direction and by the spring connections or positively in the other direction.

2. In a pegging-machine, the combination with the rotary shaft having the cam thereon and mounted in suitable bearings, of the front plate arranged to reciprocate horizontally in ways in connection with said bearings, and carrying a stationary abutment to coöperate with said cam, and adjustable spring connections between the bearings for the shaft and said front plate to compel and limit the movement of the plate in one direction, said connections comprising a member adjustably mounted on the front plate, and a spring interposed between said member and the bearings, whereby the front plate is moved positively in one direction and by the spring connections or positively in the other direction.

3. In a pegging-machine, the combination with the rotary shaft having the cam thereon and mounted in suitable bearings, of the front plate arranged to reciprocate horizontally in ways in connection with said bearings, and carrying a stationary abutment to coöperate with said cam, and adjustable spring connections between the bearings for the shaft and said front plate to limit the movement of the plate in one direction, said connections comprising the abutment $Y^4$ adjustably mounted in the front plate, and provided with screw-threads engaging with the worm-wheel $F^5$ slidingly mounted upon a support, and the spring $E^5$ interposed between the bearings and said worm-wheel.

4. In a pegging-machine, the combination with the rotary shaft having the cam thereon mounted in suitable bearings, of the front plate arranged to reciprocate horizontally in ways in connection with said bearings, and carrying a stationary abutment to coöperate with said cam, and adjustable spring connections between the bearings for the shaft and said front plate to limit the movement of the plate in one direction, said connections comprising the abutment $Y^4$ adjustably mounted in said front plate and provided with screw-threads engaged by the worm-wheel $F^5$ mounted upon the rod $B^5$ and connected with the set-nut $J^5$ so as to be rotated thereby but to move independently longitudinally thereof, and the spring $E^5$ interposed between said worm-wheel and the bearings.

5. In a pegging-machine, the combination with the rotary shaft having the cam thereon and mounted in suitable bearings, of the front plate arranged to reciprocate horizontally in ways in connection with said bearings, and carrying a stationary abutment to coöperate with said cam, and adjustable spring connections between the bearings for the shaft and said front plate to limit the movement of the plate in one direction, said connections comprising the adjustable abutment $Y^4$ mounted in the front plate, and having the threads thereon engaging the worm-wheel $F^5$, which is mounted on the rod $B^5$ secured in the cup $C^5$ in the bearings, the nut $J^5$ screwed upon the end of said rod $B^5$ and having the pins $K^5$ engaging the apertures $L^5$ in the worm-wheel $F^5$, the spring-cap $D^5$ adjacent to the worm-wheel $F^5$, and the helically-coiled expanding spring surrounding the rod $B^5$ and secured between the cup $C^5$ and the spring-cap $D^5$.

6. In a pegging-machine, the combination of the spring-impelled arm R, with the horizontal reciprocating front plate the support M' carried by said front plate, the driver-bar S having the head G' reciprocating in said support, connections between the arm R and the head G' to permit the reciprocating movement of the front plate without disengaging the parts, and means for adjusting the position of the driver-bar S comprising the bearing-ring J' screwed into the split ring L' upon the support M', the collar O' and the set-screw P' for clamping said split ring, and the washers H' interposed between the head G' and the bearing-ring J'.

7. In a pegging-machine, the combination of the frame G carrying the annuli M, with the spring-caps T containing the helical spring X, and provided with the flange $u$ having the slots V therein, which are adjustably secured to the annuli M, and the ends N adapted to fit in the annuli M and having the shoulder O and the rock-shaft P mounted in the bearings formed in the caps T by the shoulder O, substantially as and for the purpose described.

8. In a pegging-machine, the combination with the rotating shaft K having the cam-disk thereon, of the vertical reciprocating rod $S^3$, connections between the cam-disk and the rod to raise and lower it quickly once each rotation of the shaft, the knife-reciprocating rod $F^4$ mounted in the horn, the vertically-reciprocating rod $D^4$ mounted in the horn-post, connections to transmit the motion of the rod $D^4$ to the bar $F^4$, and connections between the rod $S^3$ and the rod $D^4$ comprising a lever $U^3$ pivotally mounted upon a treadle $W^3$ pivoted to the frame as at $Y^3$ and having its pivotal point $T^3$ directly over the pivotal point $Y^3$ of the treadle $W^3$, substantially as and for the purpose described.

9. In a pegging-machine, the combination with the rotary shaft having the cam thereon and mounted in suitable bearings, of the front plate arranged to reciprocate horizontally in ways in connection with said bearings, and carrying a stationary abutment to coöperate with said cam, an oppositely-disposed and adjustable abutment also adapted to coöperate therewith, and spring connections between the bearings for the shaft and said front plate to limit the movement of the plate in one direction.

ARTHUR G. LEONARD.
ALONZO GRAFFAM.
BYRON R. WOLCOTT.

Witnesses:
T. A. EMERY,
JNO. H. LEWIS.